United States Patent [19]

Doniwa

[11] Patent Number: 4,554,980
[45] Date of Patent: Nov. 26, 1985

[54] NUT RUNNER USING INDUCTION MOTOR
[75] Inventor: Tabito Doniwa, Hachioji, Japan
[73] Assignee: Daiichi Dentsu, K.K., Chofu, Japan
[21] Appl. No.: 515,364
[22] Filed: Jul. 19, 1983
[30] Foreign Application Priority Data
Oct. 13, 1982 [JP] Japan .................. 57-178562
[51] Int. Cl.[4] .......................... B23Q 5/12
[52] U.S. Cl. ............................ 173/12; 173/2
[58] Field of Search ............ 173/5, 12, 2; 81/57.11; 318/747

[56] References Cited
U.S. PATENT DOCUMENTS

| | | | |
|---|---|---|---|
| 2,864,985 | 12/1958 | Beck | 318/747 |
| 3,892,146 | 7/1975 | Yasoshima | 173/12 |
| 4,273,198 | 6/1981 | Doniwa | 173/12 |

Primary Examiner—Donald R. Schran
Assistant Examiner—James Wolfe

[57] ABSTRACT

A nut runner for tightening screwed objects comprising: a driving motor, a driving shaft to be coupled to the screwed objects for driving the same, a reduction gear mechanism provided for transferring the revolution power of the driving motor to the driving shaft, a torque for detecting a torque applied to the driving shaft, and a control circuit for controlling the driving motor by the use of the detected output of the torque detector. In accordance with the present invention, a two-phase induction motor is employed as the driving motor. The control circuit is formed to control the magnitudes, periods and phases of intermittent currents supplied to the field coils of the two-phase induction motor so that the torque of the two-phase induction motor is controlled by the control of the magnitude of the intermittent currents, so that the revolution speed of the two-phase induction motor is controlled by the control of the periods of the intermittent currents, and so that the forward and backward driving directions are switched by the switching of phase relations of the intermittent currents.

4 Claims, 9 Drawing Figures

NUT RUNNER USING INDUCTION MOTOR

BACKGROUND OF THE INVENTION

The present invention relates to improvement in an automatic screw or nut tightening tool which is called a nut runner or nut setter and employed, for example, for tightening screws of an engine cover of a car at a time. In particular, the invention pertains to improvement in a control circuit of a motor for driving such a nut runner.

An air nut runner operated by compressed air has heretofore been used, but it cannot produce a screw tightening force of high accuracy. As a nut runner for tightening screws or nuts at a high accuracy, a motor-driven nut runner using a DC motor has been proposed and is now placed on the market; however, the DC motor has the fatal defect of wear of its brushes. To avoid this, a DC brushless nut runner has been proposed which is free from the problem of wear of the brush; however, the nut runner of this type is disadvantageous in that the motor structure and the control circuit therefore are complex, and in that since a permanent magnet is used as the rotor, the volume of the motor is large relative to the motor output power, making it difficult to arrange a lot of such nut runners at a small pitch.

SUMMARY OF THE INVENTION

An object of the present invention is to provide a nut runner using an induction motor which has a small size and readily controls with a high degree of accuracy its speed, forward rotation, backward rotation, torque, braking and stop.

To attain the above object of the present invention, there is provided a nut runner for tightening screwed objects comprising: a driving motor, a driving shaft to be coupled to said screwed objects for driving the same, a reduction gear mechanism provided for transferring the revolution power of said driving motor to said drifing shaft, a torque detector for detecting a torque applied to said driving shaft, and a control circuit for controlling said driving motor by the use of the detected output of said torque detector, characterized in that said driving motor is a two-phase induction motor, and that said control circuit is formed to control the magnitudes, periods and phases of intermittent currents supplied to the field coils of said two-phase induction motor so that the torque of the two-phase induction motor is controlled by the control of the magnitude of the intermittent currents, the revolution speed of the two-phase induction motor being controlled by the control of the periods of the intermittent currents, the forward and backward driving directions being switched by the switching of phase relations of the intermittent currents.

BRIEF DESCRIPTION OF THE DRAWINGS

The present invention will be described in detail below with reference to the accompanying drawings, in which.

DETAILED DESCRIPTION

Figure 1:
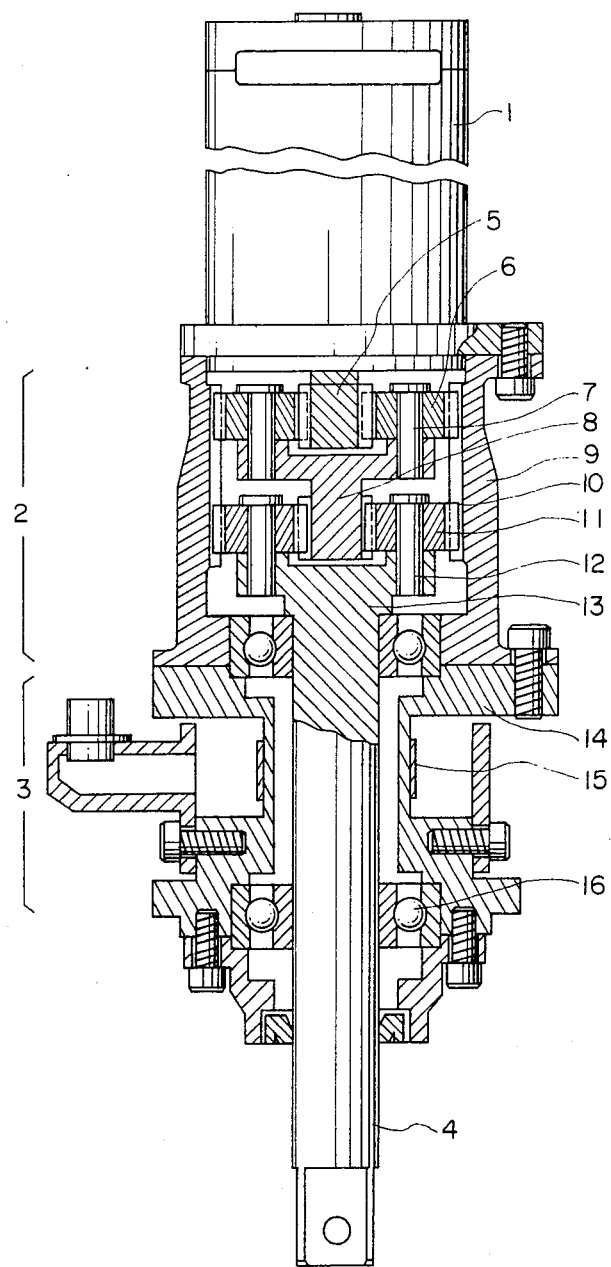
FIG. 1 is a partially sectional view illustrating the construction of the nut runner embodying the present invention.

FIG. 1 is a diagram, partly in section, illustrating the construction of a nut runner embodying the present invention, which uses a two-phase induction motor (hereinafter referred to simply as a motor) as a driving motor with the view to its miniaturization and reduction of its heat generation and, in order to solve problems arising therfrom, employs a control circuit of a nut runner controller generally provided outside a nut runner and a power source circuit using a thyrister for supplying a current to the motor, and in which the speed and torque of the motor are controlled by controlling the period and magnitude of intermittent currents supplied to the motor, and forward or backward driving of the motor by switching the phase of the intermittent currents and a sudden stop of the motor by DC braking can be achieved very easily and effectively.

In FIG. 1, reference numeral 1 indicates a motor; 2 designates a reduction gear mechanism; 3 identifies a torque detector; 4 denotes a driving shaft, on the top end of which is mounted a socket for receiving a screw head or a nut; 5 represents a motor output shaft gear; 6 shows a first-stage planetary gear; 7 refers to a first-stage planetary gear shaft; 8 signifies a second-stage sun gear; 9 indicates a reduction gear case; 10 designates an internal gear; 11 identifies a second-stage planetary gear; 12 denotes a second-stage planetary gear shaft; 13 represents a final output shaft; 14 shows a torque detector case; 15 refers to a strain gauge; and 16 signifies an output shaft bearing. The abovesaid members are known per se and not directly related to the present invention, and hence they will not be described individually.

Figure 7:
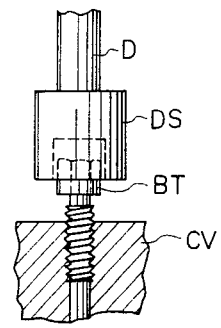
FIG. 7 is a view explanatory of an example of screw tightening operations.

To facilitate a better understanding of the present invention, a description will be given first of the method of using the nut runner. FIG. 7 shows, by way of example, a state in which a screw BT fitted into a socket DS mounted on the top end of the drive shaft 4 in FIG. 1 is clamped to an engine cover CV or the like. In this example, as shown in the revolving speed to torque characteristic diagram of FIG. 8, the revolving speed P2 is high from a point $a_0$ where the motor is started to a point $a_2$ where the head of the screw BT comes to rest on the cover CV, but upon resting of the screw head on the cover CV, the revolving speed rapidly drops and the torque P1 sharply increases. When the torque reaches the point $a_2$, the nut runner is quickly stopped. Then, the second-stage clamping takes place but, in this case, until a standard torque $a_3$ is reached, the motor revolving speed (very low) and the motor output are controlled while feeding back by the value of torque itself so that the torque may increase at a preset rate of increase. When the standard torque $a_3$ is reached, the motor is stopped suddenly. Such revolving speed P2 and torque P1 and signals for start, stop and so forth are set on a panel of a controller provided separately of the nut runner, and they are provided to a control circuit (FIGS. 2A and 2B) of each nut runner under program control.

Next, the nut runner of the present invention employs a two-phase induction motor (hereinafter referred to simply as IM) as the driving motor. The IM is small and rigid and easy for maintenance, and hence it is suitable for high-speed use, but its most serious defect in the past is difficulty in controlling its speed; this is a reason for which a DC motor could not easily be substituted by the IM. Letting the number of poles, its slip and the frequency of a voltage applied to the motor be represented by m, s and f, respectively, the speed v of the IM is given by $$v = \frac{120f}{m}(1-s).$$

Therefore, the speed control can be effected by changing any one of m, s and f. It is well-known, however, that the methods of changing m and s have many defects, and that only the method of changing the frequency permits continuous, high efficiency speed control over a wide range. In the past, however, this method has not yet been put to practical use because of difficulty in obtaining a variable frequency power supply. Recently the variable frequency power supply could have been obtained as a result of marked development of a thyristor inverter so that the speed control of the IM by the frequency control has been developed, but its application to the nut runner has encountered various problems and has not been carried forward into practice. According to the present invention, the frequency and the phase of an interrupted current of the IM and the magnitude of a current supplied to a field coil of the motor are varied, by which the speed and the torque of the motor are changed to predetermined values so that the forward and reverse driving and a sudden stop of the motor are controlled. The control circuit therefor will be described with reference to FIGS. 2A and 2B.

The clamping torque for screw tightening by the nut runner ranges, for example, from about 1 to 100 kgm. Accordingly, a high output motor is often used while a current applied thereto may sometimes be as high as several tens of amperes. Furthermore, the nut runner may sometimes be moved in accordance with the movement of the assembly line and, in such a case, the motor driving circuit (incorporated in the controller) and the nut runner are interconnected by a long cable. Consequently, the motor may be short-circuited by frequent bending of the cable or damaged by an unexpected large load and, when a power transistor is used as an element for controlling the power input to the motor so as to avoid such an accident, the protective circuit becomes complex. In contrast thereto, the use of a thyristor in place of the transistor is advantageous in that the thyristor well withstands severe conditions of use, and in that the protective circuit may be formed by the addition of a resistor alone. However, the thyristor does not possess the self-turning-OFF function and it is therefore necessary to technically make up for this function. Since the present invention is described for an example using the thyristor, the method of turning OFF the thyristor will also be described in respect to FIGS. 2A and 2B.

Figure 4:
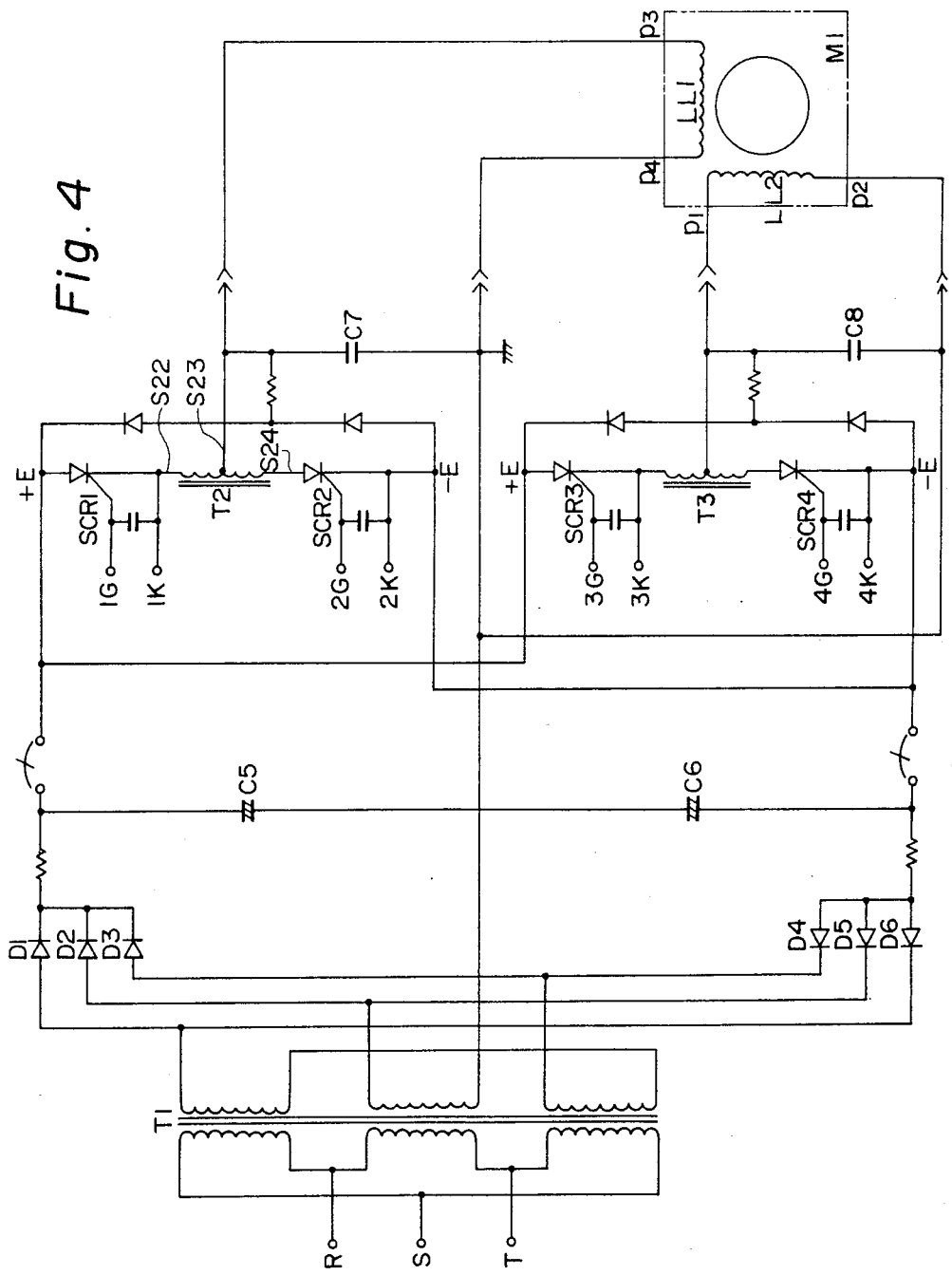
FIG. 4 is a diagram showing a power source circuit and the motor connection.

A description will be given first of the power source of the IM for driving the nut runner. FIG. 4 illustrates the power source circuit of the IM and, in this example, a two-phase motor M1 is driven by commercial power sources R, S and T of three phases under control of the thyristor. In FIG. 4, an input transformer T1 of the Δ-Y connection, rectifiers D1 to D6 and capcitors C5 and C6 constitute an AC-DC converter which performs AC-DC conversion through three-phase half-wave rectification, and generate positive and negative voltages +E(V) and −E(V) on both sides of the grounding point. Elements SCR1 to SCR4 are thyristors (SCR), which are used in pairs for individual field coils of the motor. It is a circuitry including the thyristors SCR1 and SCR2, a reactance T2 and a capacitor C7 to supply an interrupted current to a field coil LL1 of the motor M1, and it is a circuitry including the thyristors SCR3 and SCR4, a reactance T3 and a capacitor C8 to supply to a field coil LL2 an interrupted current phased 90 degrees apart from the current supplied to the field coil LL1. By applying trigger pulses to terminals (1G, 1K), (2G, 2K), (3G, 3K) and (3G, 4K) of the thyristors SCR1 to SCR4 in a predetermined order of turning ON the thyristors SCR1 to SCR4, the motor M1 is driven in the forward or reverse direction at will and the motor M1 is stopped by output pulses SA, SB, SC and SD of control circuits shown in FIGS. 2A and 2B. The motor control signals and other operations of the motor M1 will be described next with regard to FIGS. 2A, 2B and 4.

Figure 2A:
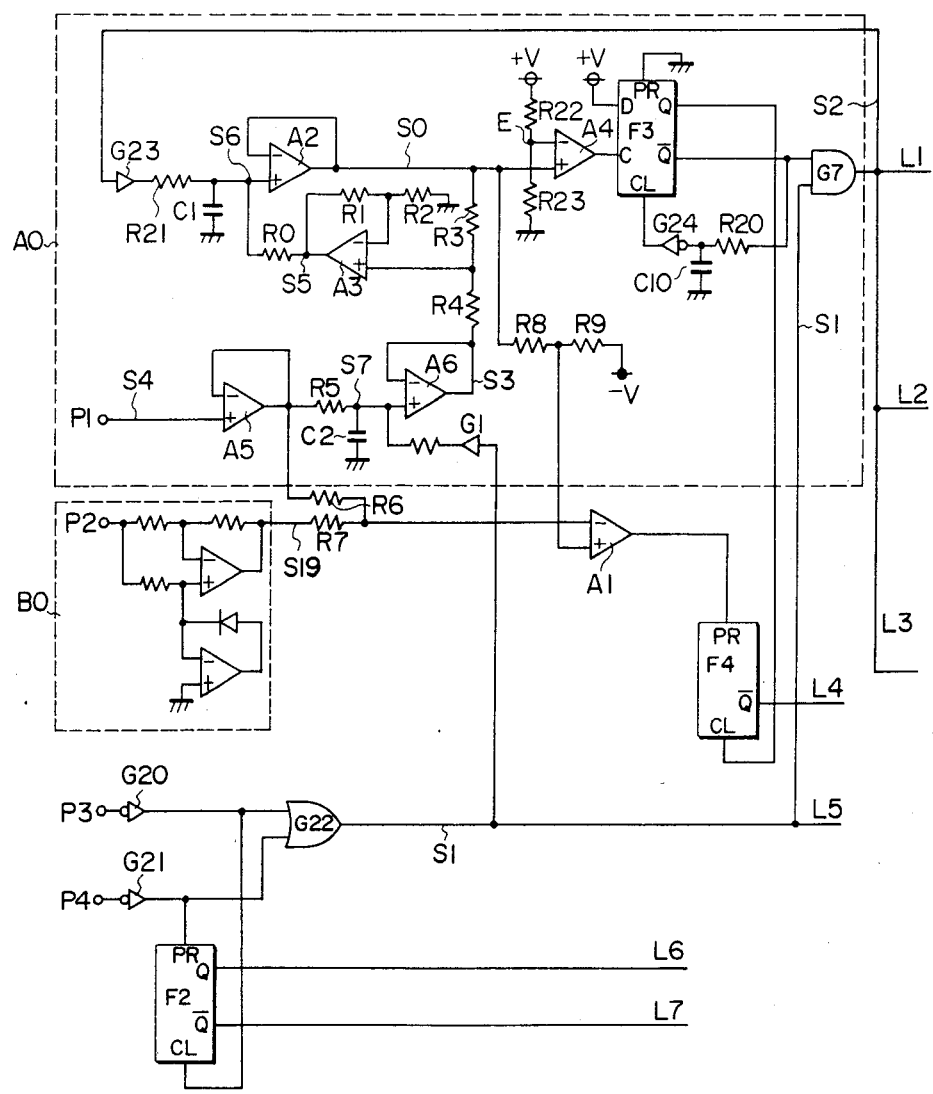
FIGS. 2A and 2B are diagrams illustrating in combination a control circuit of the nut runner of the present invention.
Figure 2B:
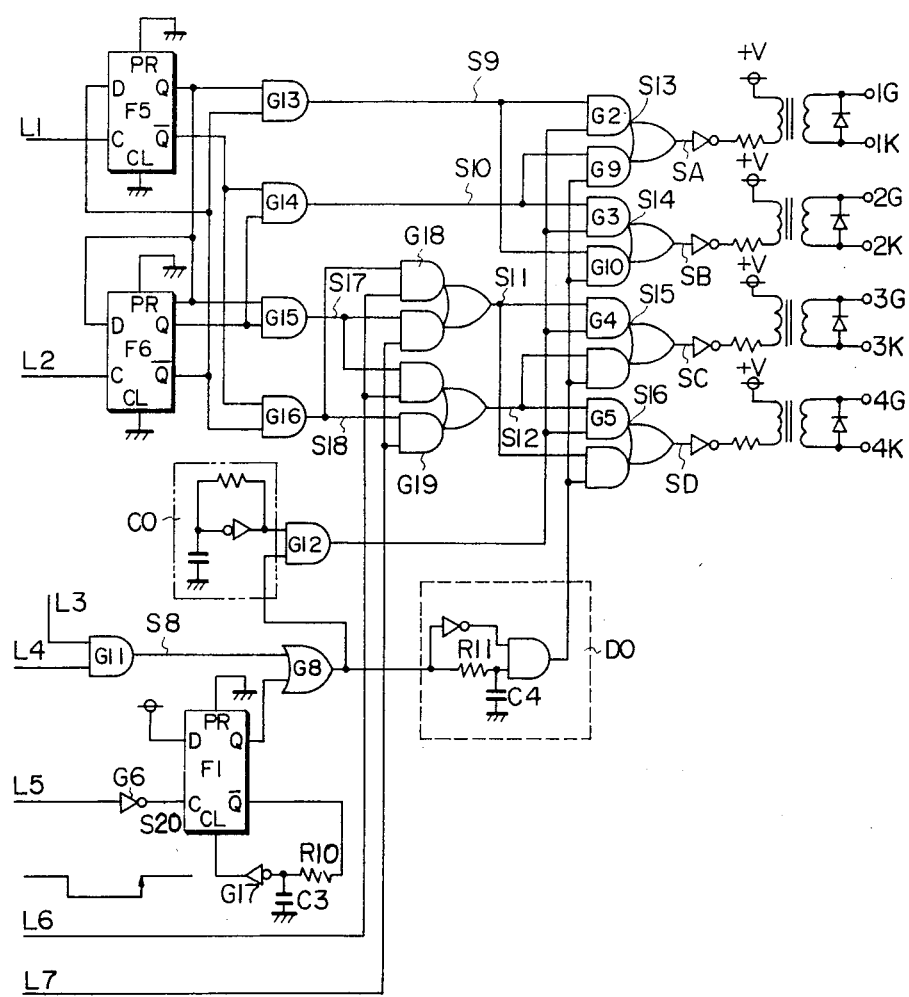
Figure 8:
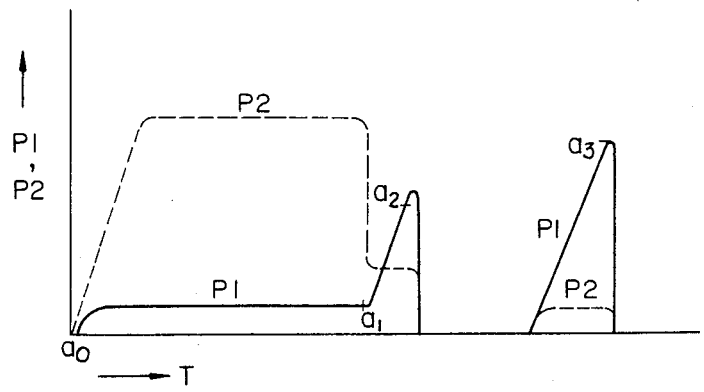
FIG. 8 is a time chart showing the revolving speed and torque characteristics of the nut runner.

FIGS. 2A and 2B illustrate in combination, by way of example, the arrangement of the nut runner control circuit of the present invention. References P1 to P4 at the left-hand side of FIG. 2A are signal inputs which are provided from the abovesaid controller under program control, for instance, as shown in FIG. 8. The input P1 is a signal of commanding the motor revolving speed (which is a constant voltage for each revolving speed), the input P2 a voltage proportional to the torque based on the output from the torque detector shown in FIG. 1, and the inputs P3 and P4 voltages of commanding forward and backward rotation of the motor, respectively, which are generally provided from the controller under control of a preset program or manually. Reference character AO, indicated by the broken line, indicates a generator which generates a thyristor control signal S2 for applying an interrupted current (described in respect of FIG. 3)to the motor; BO designates a circuit for converting a torque proportional voltage to an absolute value; CO identifies a high frequency generator; and DO denotes an OFF pulse generator. To four pairs of terminals 1G, 1K, 2G, 2K, 3G, 3K, 4G and 4K at the right-hand side of FIG. 2B are provided pulses of pulse widths proportional to the revolving speed and torque of the motor which are supplied as trigger voltages to the four thyristors of the power source section in FIG. 4 in the order depending on the direction of rotation of the motor. The names of the other members will be made clear in the following description of the operation.

(1) BASIC THYRISTOR CONTROL SIGNAL S2 GENERATOR (AO)

The generator AO generates the basic control signal S2 which starts the motor M1 under a load and causes the rotation of the driving shaft of the nut runner to reach a predetermined value in the shortest period of time. In the generator AO, references A2, A5 and A6 are voltage follower amplifiers (having a gain close to one), A3 an adder, A4 a comparator, F3 a flip-flop, PR its preset input terminal and CL its clear input terminal. References G1 and G23 are gates and their output circuits each take the form of an open collector, the output of which is grounded in a case of an input logical value being a state "0" and is open in a case of the input logical value being a state "1". Reference G24 is an inverter and G7 an AND gate.

(1)-1 OPERATION OF FLIP-FLOP F3

Assuming that the flip-flop F3 is in its reset state, the logical value (hereinafter referred to as the logic) of its $\bar{Q}$ output is the state "1" so that the $\bar{Q}$ output of the flip-flop F3 applied through a resistor R20 assumes the state "0" at the output of the inverter G24, holding the flip-flop F3 in the reset state. Now, if the C input of the flip-flop F3 goes to the logic "1" to put the flip-flop F3 in its set state, its $\bar{Q}$ output goes to the state "0" upon application of the input. However, the input to the inverter G24 goes to the state "0" because of a time constant circuit made up of a capacitor C10 and the resistor R20 and, at this time, the output from the inverter G24 goes to the state "1" for the first time, resetting the flip-flop F3 to its cleared state. Thus the flip-flop F3 is always stable in its reset state and, even if it is set, it stays in the set state only for a period of a time constant U determined by values of the capacitor C10 and the resistor R20 and returns to the reset state. That is to say, the flip-flop F3 is one that is set upon each occurrence of its C input but reset after the period of time U. The reset output from the flip-flop F3 is provided to the AND gate G7 and, in this case, when the other input S1 to the AND gate G7 is at the logic "1", the (thyrister) control signal S2 is produced. As will be described later, the signal S1 goes to the logic "1" as long as the motor is commanded to rotate regardless of the direction of its rotation, and the signal S2 goes to the logic "1" upon each application of the C input to the flip-flop F3.

(1)-2 SAWTOOTH WAVE GENERATOR AND ITS FREQUENCY CONTROL CIRCUIT

Figure 3:
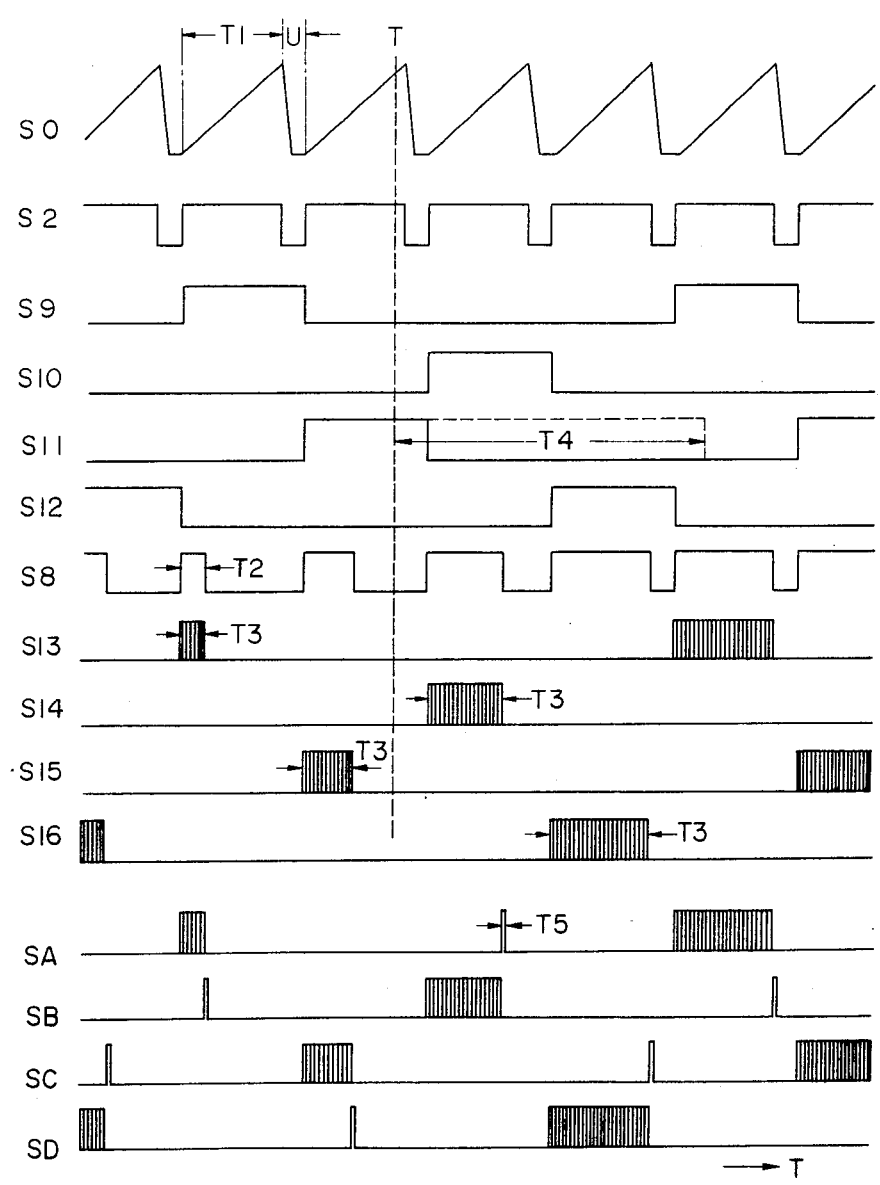
FIG. 3 is a timing chart showing voltages of respective parts in FIGS. 2A and 2B.

In a case where the signal S1 is at the logic "1", the output of the gate G1 is opened as mentioned above, exerting any influence on the voltage follower A6. Even if a motor speed designating signal voltage P1 is applied in this state to cause an input S4 of the voltage follower A5 to reach a predetermined voltage, an input voltage S7 to the voltage follower A6 by the output from the voltage follower A5 rises with an inclination following a time constant determined by values of a resistor R5 and a capacitor C2 and, therefore, an output voltage S3 from the voltage follower A6 also rises with an inclination. On the other hand, the adder A3 and the voltage follower A2 form a sawtooth wave generator connected in the form of a loop, and its oscillation waveform becomes sawtooth-shaped as indicated by reference character S0 in FIG. 3 which shows timing charts of voltages occurring at respective parts in FIGS. 2A and 2B. When a condition: R1=R2=R3=R4 is provided in the adder A3, the output S5 from the adder A3 is equal to the sum of the inputs S3 and S0 thereto, i.e. S5=S0+S3, and the input S6 to the voltage follower A2 is equal to the output S0 therefrom, i.e. S6=S0, so that S5=S6+S3; therefore, a potential difference across a resistor R0 is always a value: S5−S6=S3. Moreover, the period T1 of the waveform S0 in FIG. 3 is given by the following equation:

$$T1 = K.C1.R0/S3$$

where K is a proportional constant. Since the values of the capacitor C1 and the resistor R0 are fixed, the period T1 is inversely proportional to the voltage S3 alone. On the other hand, since the magnitude of the voltage S3 is dependent on the speed designating signal P1 as described above, the period T1 of the wave S0 is inversely proportional to the magnitude of the signal P1. Incidentally, the sawtooth wave is produced to drive the motor M1 in response to the signal S0. In this case, since the signal S2 is at the logic "1" to open the gate G23, a small-resistance resistor R21 has no effect on the time constant circuit formed by the resistor R0 and the capacitor C1 while the signal P1 is provided.

Next, the signal S6=S0 is applied to the positive side input of the comparator A4, and a standard voltage E produced by resistors R22 and R23 is applied to the negative side input of the comparator A4. In a case where E>S0, the output of the comparator A4 is at the logic "0" and it is at the logic "1" when E<S0. The voltage S0 rises with a constant inclination and, at the instant when the standard voltage E becomes smaller than the voltage S0, the flip-flop F3 is set and its $\bar{Q}$ output remains at the 0 level for the short period of time U as mentioned previously. Consequently, so long as the signal S1 remains at the logic "1" (the signal being either positive or negative), the output from the gate G23 having passed through the AND gate G7 is also grounded so that the oscillation voltage S6 disappears (goes to a state "0"), resulting in the output from the comparator A4 also going to the state "0". After the lapse of the time U, the output from the gate G7 goes back to the state "1" and the output of the gate G23 is opened. The oscillation voltage S6 rises again at a fixed angle of inclination to the time axis to set the flip-flop F3 when the standard voltage E becomes smaller than the signal S0. After the lapse of the time U the flip-flop is reset and the voltage follower output S6 starts to rise. The abovesaid operations are repeated while the signal S1 remains at the logic "1". Accordingly, it will be understood that the waveform of the sawtooth wave S0 becomes as indicated by reference character S0 in FIG. 3, and that the position of the period U and the waveform of the signal S2 become such as shown in FIG. 3.

Incidentally, an increase in the voltage of the speed signal S4 (=P1) causes an increase in the current supplied from the resistor R0 and reduces the period T1, whereas a decrease in the voltage of the signal S4 causes an increase in the period T1. That is to say, since the oscillation frequency can be increased from a low frequency to a predetermined frequency with a fixed time constant, the motor speed can be varied with the magnitude of the motor speed designating signal voltage P1.

(1)-3 THYRISTER TRIGGER VOLTAGE GENERATOR

This circuit is comprised of flip-flops F5, F6 and AND gates G13 to G16, G2, G3, G4 and G5. The D input and the Q output of the flip-flop F5 are connected to the $\bar{Q}$ output and the D input of the flip-flop F6, respectively. The C inputs of the flip-flops F5 and F6 both receive the signal S2, and a circuit formed by the flip-flops F5 and F6 is known as a phase shifter in which the Q outputs from the flip-flops F5 and F6 have a phase difference of 90 degrees. As described previously, the signal S2 is generated following the resetting and setting of the flip-flop F3 as shown in FIG. 3 as long as the forward or backward rotation signal is applied. However, when the signal S2 is the 0 level, the D input of the flip-flop F5 assumes the logic "1", so that when the pulse S2 is applied first as the logic "1" to the C input of the flip-flop F5, the Q output of the flip-flop F5 immediately goes to the logic "1" upon the rise of this pulse. On the other hand, the D input of the flip-flop F6 is the logic "0" when the signal S2 is the logic "0", and the Q output of the flip-flop F6 is the logic "0" when this signal S2 is input thereto. Accordingly, at this time, only one G13 of the four AND gates G13 to G16 on the output sides of the flip-flops F5 and F6 is turned ON and the others G14 to F16 are turned OFF. When the signal S2 goes to the logic "0" next, the Q output of the flip-flop F5 remains in the state "1" but the D input of the flip-flop F6 is in the state "1", so that when a second pulse S2 is provided, the Q output of the flip-flop F6 goes to the logic "1" upon the rise of the pulse, turning ON the AND gate G15 alone. In this way, the outputs from the flip-flops F5 and F6 are supplied to the AND gates G13 to G16 to generate therefrom signals S9, S11, S10 and S12 which are displaced 90 degrees apart in phase as shown in FIG. 3. Upon each occurrence of the pulse S2, these signals occur in the order of S9-S11-S10-S12 and they are allocated and applied as trigger voltages SA, SB, SC and SD to control electrode terminals of the thyristers via the AND gates G2, G3, G4 and G5. In FIGS. 2A and 2B, reference characters G18 and G19 indicate AND gates, which are switching circuits controlled by forward and backward driving signals.

(2) SPEED CONTROL

This can easily be done by merely changing the magnitude of the speed signal S4 as described previously in (1)-2.

(3) TORQUE CONTROL CIRCUIT

It is well-known that the nut runner driving motor suffers an energy loss unless it is selected to have a suitable horsepower corresponding to the output power. In the screw tightening operation, however, the load varies at all times and, in addition, a large number of nut runners are often disposed in parallel at a small pitch; therefore, it is desired to minimize the external form of each nut runner. On the other hand, when applied a larger input than it needs, the motor generates much heat; this does not meet with recent energy-saving requirement. If the motor input is interrupted, then the revolving speed of the motor is proportional to the input frequency and the motor output power is proportional to the pulse width of the input. Further, the internal impedance of the motor increases in proportion to the motor revolving speed. It is one of the features of the present invention to make the pulse width of the motor driving power proportional to the revolving speed and the load so that the motor may produce an appropriate output power corresponding to the load torque.

In FIG. 2A, the circuit BO is provided to convert a torque proportional voltage to the corresponding absolute value. The input signal P2 to this circuit is a voltage proportional to the torque detected by the torque detector shown in FIG. 1 and, since the voltage proportional to the torque varies in the positive or negative direction depending on the direction of the torque, the circuit BO corrects the positive and negative variations to an absolute value. The arrangement and the operation of this circuit are well-known; hence no detailed description will be given. Even if the signal P2 is $\pm E(V)$, the output voltage S19 of this circuit is always $+E(V)$, and this load-proportional voltage S19 is added to the motor speed-proportional voltage S4 (the output from the voltage follower A5) via resistors R7 and R6, the added output being fed to the minus input of a comparator A1. To the plus input of the comparator A1 is applied the voltage of the waveform S0 after being divided by resistors R8 and R9. When the minus input exceeds the plus input, the comparator A1 generates a logic "1" output, by which a flip-flop F4 is set, making its $\overline{Q}$ output the logic "0". Since the clear (CL) input of the flip-flop F4 is connected to the Q output of the flip-flop F3, however, the flip-flop F4 is reset after the constant time U determined by values of the resistor R20 and the capacitor C10 and its $\overline{Q}$ output goes back to the logic "1" as is the case with the operation of the flip-flop F3 by the signal S0.

A gate G11 is an AND gate for the $\overline{Q}$ output from the F4 (which is the logic "1" when the flip-flop F4 is in the reset state) and the signal voltage S2 (which is the logic "1" in a case where the signal S1 is the logic "1", the flip-flop F3 is in the reset state and its $\overline{Q}$ output is the logic "1"). When the signal voltage S2 and the $\overline{Q}$ output from the flip-flop F4 are the logic "1", the gate output S8 undergoes such a variation as indicated by S8 in FIG. 3 and its pulse width $T_2$ is proportional to the revolving speed and the load torque of the nut runner. If the signal S8 is held as it is, since its mutual transport processing by a transformer is difficult; this signal is combined to the output of the high-frequency oscillation circuit CO (which is commercially available and has the oscillation frequency of several tens of kilohertzes used as a carrier etc.) at an AND gate G12, yielding an output S13 in a case of the signal S9 being activated and an output S14 in a case of the signal S10 being activated. Similarly, outputs S15 and S16 are obtained in the cases of the signals S11 and S12 being activated, respectively as shown in FIG. 3.

(4) REVERSIBLE ROTATION OF THE MOTOR

In FIG. 4, the direction of rotation of the two-phase IM can be reversed by changing over two terminals of one of the two filed coils LL1 and LL2. For this purpose, a switch or electromagnetic switch can be employed. However, since the nut runner is frequently changed over between the forward and backward rotation, the use of such a switch introduces serious problems in practical use, such as the durability of contacts in terms of wear, noise generation owing to spark discharge by the contacts, etc., and it is not advisable to add a special device for the reversible running of the motor. In the present invention, since the two-phase IM can be reversed by inverting only one phase thereof, it is effected by changing over, for example, the signals S10 and S11 in FIG. 3. This will be described next with regard to FIGS. 2A and 2B.

In FIG. 2A, reference P3 is a forward rotation signal voltage input and P4 a backward rotation signal voltage input. Now, when the forward rotation signal P3 is applied to, an inverter G20 produces a logic "1" output and when the backward rotation signal P4 is applied to, an inverter G21 generates a logic "1" output. Consequently, the output S1 from an OR gate G22 is always the logic "1" if the forward or backward rotation command signal is applied thereto. Reference F2 is a flip-flop; when the forward rotation signal P3 is applied to, the flip-flop F3 is reset and its outputs Q and $\bar{Q}$ go to the logic "0" and the logic "1", respectively. As illustrated, the Q and $\bar{Q}$ outputs from the flip-flop F2 are applied to groups of AND/OR gates G18 and G19 to provide a condition: S17=S12 and a condition: S18=S11, and their phase relationships are such as shown in FIG. 3. Next, when the backward rotation signal is applied to, the flip-flop F2 is set to generate the logic "1" at the Q output and the logic "0" at the $\bar{Q}$ output and, by the gates G18 and G19, a condition: S18=S12 and a condition: S17=S11 are provided; namely, the condition opposite to that during the forward rotation is obtained. In this way, the present invention permits arbitrary reversible rotation of the motor only by the additional provision of an integrated circuit of the flip-flop F2 and the gates G18 and G19, and hence it is markedly convenient in practical use.

(5) BRAKING AND STOPPING OF THE MOTOR

In screw tightening by the nut runner, it is required to stop the motor rapidly and completely when the screw has been tightened to satisfy a predetermined condition. The most efficient way of stopping the motor is DC-braking by supplying a DC current to the field coil of the motor M1. In FIG. 2B, an inverter G6 and a flip-flop F1 form a circuit which performs this operation. The output from the inverter G6 assumes the logic "0" in a case where it is supplied with the forward or backward rotation signal P3 or P4 and the signal S1 is the logic "1", but when neither of the forward and backward rotation signals P3 and P4 is applied to, the signal S1 assumes the logic "0" and the output S20 from the inverter G6 goes to the logic "1" while the flip-flop F1 is set upon rising of the output S20 from the inverter G6. Since the flip-flop F1 is associated with a time constant circuit composed of a resistor R10, a capacitor C3 and an inverter G17 as is the case with the flip-flop F3, the flip-flop F1 (even if it is set) is automatically reset after a time T4 determined by values of the resistor R10 and the capacitor C3. Accordingly, when the signals P3 and P4 are both stopped, the gate G7 of the sawtooth wave generator AO is closed and the signal S2 goes to the logic "0", holding the signals S9, S10, S11 and S12 unchanged. Assuming now that the signals P3 and P4 are both turned OFF at the time T as shown in FIG. 3, since only the AND gate G15 is opened while the Q output of the flip-flop F2 assumes the logic "1", only the signal S11 is the logic "1", by which the gate G4 is opened to provide the signal S15, which becomes the signal SC, turning ON the thyristor SCR3 shown in FIG. 4. However, this signal S15 goes to the logic "0" after the elapse of time corresponding to the time constant T4 determined by the values of the resistor R10 and the capacitor C3 of the time constant circuit associated with the flip-flop F1. Accordingly, a DC current is applied only to the field coil LL2 of the motor M1 in this while and the motor M1 is quickly locked by DC braking.

(6) TURNING OFF OF THE THYRISTER

The present invention has been described for an embodiment employing thyristers. The thyristers has no self-turning-OFF function and, in order to make up for this, the OFF pulse generator DO is provided as shown in FIG. 2B. This is a circuit which generates an OFF pulse the duration T5 of which is dependent on a time constant determined by values of a resistor R11 and a capacitor C4 only when the logic of the output from a gate G8 changes from the logic "1" to the logic "0" Incidentally, the output from the gate G8 changes from the logic "1" to the logic "0" when the flip-flop F1 is set by a motor stop instruction signal, that is, cutting-off of both of the forward rotation signal and the backward rotation signal. Accordingly, assuming that a motor stop instruction signal is issued when the thyrister SCR1 conducts to supply a current to the field coil LL1 in FIG. 4, that is, when the trigger voltage SA is applied to in FIG. 2, the OFF pulse is generated in response to the instruction signal and, as is evident from the circuit diagram of FIG. 2B, it is applied as the trigger voltage SB via a gate G10 to the thyrister SCR2. Since this relation exists also between the thyristers SCR1 and SCR2 and between the thyristers SCR3 and SCR4, the generation of the trigger voltages SA to SD and the generation of the OFF pulse are carried out under such a relationship as shown in FIG. 3.

Figure 5:
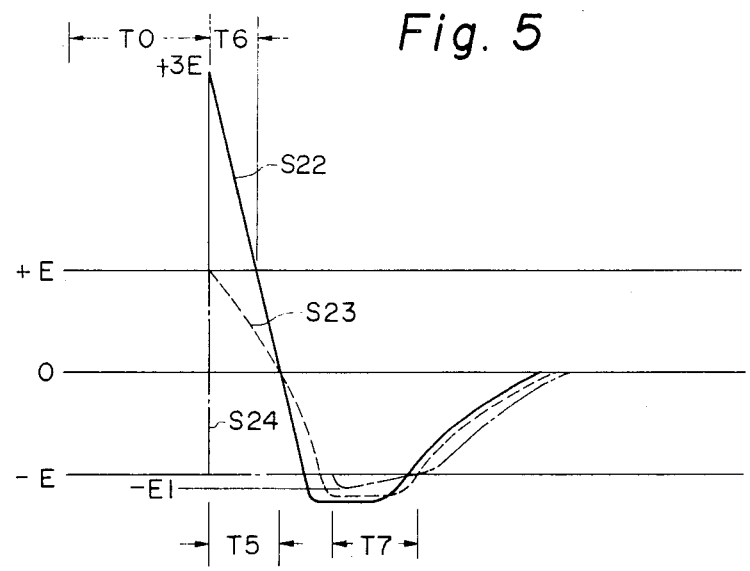
FIG. 5 is a timing chart showing voltages of respective parts in FIG. 4 when turning OFF a thyrister.

Referring next to FIG. 5, a description will be given of turning OFF of the thyrister by the OFF pulse. FIG. 5 is a timing chart showing voltage wavforms occurring at respective parts in the case of turning OFF the thyrister SCR1, voltage fluctuations at terminals S22, S23 and S24 of the reactor T2 in FIG. 4 being shown by the solid line, the broken line and the one-dot chain line, respectively. In FIG. 2B, when the trigger voltage SA is being generated, the thyrister SCR1 assumes the ON state and, in FIG. 5, this is indicated by a region TO, and the voltages of the terminals S22, S23 and S24 assumes a value of +E. However, when the signal of the trigger voltage SA is stopped, the OFF pulse occurs on the trigger voltage SB as described previously and when a current flows to the thyrister SCR2 within a short time in response to the OFF pulse, the voltage instantaneously rises, for instance, up to a value of +E by an induction voltage at the time of extinction of the current (because the voltage S23 is a value of +E while the voltage S22 is boosted by the reactor to reach a value of +2E, hence the potential on the line S22 becomes a value of 3E) and then linearly falls below a value of −E, thereafter rising up to zero volt. In a period T6 in which the voltage of the terminal S22 drops from a value of +3E to a value of +E, the voltage of the terminal S22 is larger than a value of +E. Since the anode voltage of the thyrister is always a value of +E, the cathode voltage is higher than the anode voltage in the period T6. The trigger voltage SA has been terminated after the period TO in FIG. 5, so that if the time T6 is longer than the turning OFF time of the thyrister, the thyrister SCR1 is turned OFF. By the way, the time T6 is determined by the inductance of the reactor T2, the capacitance of the capacitor C7 and the impedance of the motor coil LL1.

In FIG. 5, since the OFF pulse is applied to the thyrister SCR2 to turn it ON at a time after the period TO, the voltage S24 quickly falls down to a value of −E and further drops below a value of −E1 and, after a time period T7, rises up to zero volt. The cathode voltage of the thyrister SCR2 is always a value of −E and the time length T7 is a period in which the anode voltage of the thyrister SCR2 is lower than the cathode voltage. Furthermore, the time period T7 appears after the duration T5 of the OFF pulse, so that if the time period T7 is longer than the turn-OFF period of the thyrister, the thyrister SCR2 is turned OFF in this period. The above is the principle of applying the OFF pulse to a pair of operating thyristers to ultimately turn OFF the both thyristers. The time period T7 is determined by values of T2, C7, R9 and LL1.

(7) STATE OF VOLTAGES WHICH ARE APPLIED TO THE MOTOR COILS LL1 AND LL2

Figure 6:
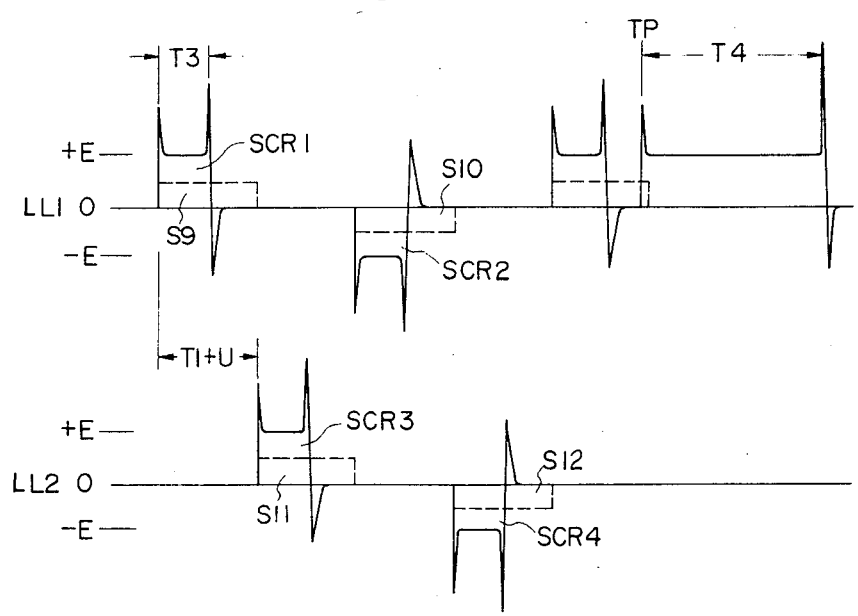
FIG. 6 is a diagram showing waveforms of pulse voltages applied to field coils of the motor.

Assuming that the motor coil LL1 is grounded at one end p4 as shown in FIG. 4, the voltage at the other end p3 assumes as shown by reference LL1 at the upper portion of FIG. 6, while the voltage at one end p1 of the coil LL2 with reference to the voltage at the other end p2 assumes as shown by reference LL2 at the lower portion of FIG. 6. As shown in FIG. 3, DC pulses are applied to the field coils LL1 and LL2 in the order of S9-S11-S10-S12 so as to be displaced by 90 degrees in phase within a period T1+U shown in FIG. 6, and the flowing directions of the currents to the coils LL1 and LL2 alternately vary but the period T1+U is reduced by the generator AO in FIG. 2A from a constant period of time to a predetermined one. In FIG. 6, reference TP indicates a point at which the forward or backward rotation signal disppears, and T4 a duration during which a DC voltage is applied to the coil LL1 after the motor is stopped. The broken-lined regions are those in which the pulses S9, S10, S11 and S12 have the logical value "1", and T3 indicates that the signal S8 is generated with a duration proportional to the motor revolving speed and the load torque.

As will be appreciated from the foregoing description, in accordance with the present invention, although an induction motor is used as the driving motor, its control, such as speed, forward and backward rotation, torque, braking and stop, can be achieved easily and surely with a high degree of accuracy, and the arrangement therefore is also simple and free from the defects of the prior art.

What I claim is:

1. In a nut runner for tightening screwed objects comprising:

a driving motor, a driving shaft to be coupled to said screwed objects for driving the same, a reduction gear mechanism provided for transferring the revolution of said driving motor to said driving shaft, a torque detector for detecting a torque applied to said driving shaft, and a control circuit for controlling said driving motor by the use of the detected output of said torque detector, said driving motor being a two-phase induction motor having a rotor and field coils, and said control circuit comprising means to control the magnitudes, repetition frequency and phase relations of intermittent currents supplied to field coils of said two-phase induction motor so that the torque of the two-phase induction motor is controlled by control of the magnitude of the intermittent currents, the revolution speed of the two-phase induction motor is controlled by control of the repetition frequency of the intermittent currents and the forward and backward driving directions are switched by the switching of phase relations of the intermittent currents, said control circuit comprising means operating said motor at high speed during a first stage of tightening said screwed object, decelerating and quickly stopping said motor when the torque detected by said torque detector reaches a first pre-set reference value, immediately restarting said motor and operating it in the same direction at a lower speed during a second stage of tightening said object, and braking said motor to a sudden stop when the torque detected by said torque detector reaches a second pre-set reference value higher than said first reference value.

2. A nut runner according to claim 1, in which said two-phase induction motor is braked by flowing a direct-current from the control circuit to one of two field coils of the two-phase induction motor.

3. A nut runner according to claim 1, in which said control circuit comprises a saw-tooth wave generator having the same repetition frequency as that of the intermittent currents, the repetion frequency of the saw-tooth wave being controlled by the voltage of a dc input signal employed as a motor speed designating signal voltage.

4. A nut runner according to claim 1, in which said intermittent currents are supplied to the field coils of the two-phase induction motor through thyristers having self-turning-off functions.

* * * * *